United States Patent [19]
Shirley et al.

[11] Patent Number: 4,569,239
[45] Date of Patent: Feb. 11, 1986

[54] LINEAR ACTUATOR RELEASE MECHANISM AND ELECTRONIC CRUISE CONTROL BASED THEREON

[75] Inventors: James G. Shirley, Lake Worth, Fla.; Merlin J. Applegate, Grand Rapids; Floyd Brouwer, Jenison, both of Mich.

[73] Assignee: Sound Off Safety Systems, Inc., Hudsonville, Mich.

[21] Appl. No.: 511,310

[22] Filed: Jul. 6, 1983

[51] Int. Cl.⁴ .................. F16H 25/20; F16H 57/00
[52] U.S. Cl. .................. 74/89.15; 74/625; 74/405; 180/179
[58] Field of Search ........... 74/89.15, 110, 405, 74/513, 625; 318/14; 180/170, 178, 179, 175; 403/348, 349

[56] References Cited

U.S. PATENT DOCUMENTS

| | | | |
|---|---|---|---|
| 636,616 | 11/1899 | Barton | 403/348 |
| 1,565,070 | 3/1924 | Edwards . | |
| 1,909,470 | 5/1933 | Jacobson . | |
| 2,054,806 | 9/1936 | Bush | 175/335 |
| 2,066,956 | 1/1937 | Williams | 287/103 |
| 2,462,533 | 2/1949 | Moynihan | 172/290 |
| 2,510,377 | 6/1950 | Carr | 403/348 |
| 2,752,546 | 6/1956 | Frisch | 318/135 |
| 2,816,617 | 12/1957 | Lee | 180/82.1 |
| 2,963,915 | 12/1960 | Straub | 74/88 |
| 2,976,569 | 3/1961 | Quere et al. | 403/348 |
| 2,989,871 | 6/1961 | Straub et al. | 74/99 |
| 3,023,328 | 2/1962 | Sanford | 310/14 |
| 3,425,009 | 1/1969 | Voigt et al. | 335/177 |
| 3,768,319 | 10/1973 | Lill | 74/20 |
| 3,793,896 | 2/1974 | Price et al. | 74/89.15 |
| 3,824,420 | 7/1974 | Stegeman et al. | 310/89 |
| 4,132,284 | 1/1979 | Tomecek | 180/105 E |
| 4,187,734 | 2/1980 | Mann | 74/405 |
| 4,194,718 | 3/1980 | Baker et al. | 74/625 |
| 4,287,782 | 9/1981 | Ruschek | 74/405 |
| 4,438,662 | 3/1984 | Walton et al. | 74/625 |

*Primary Examiner*—Lawrence J. Staab
*Attorney, Agent, or Firm*—Price, Heneveld, Huizenga & Cooper

[57] ABSTRACT

The specification discloses a linear actuator including a quick-release mechanism enabling the actuator to be successfully commercially utilized in a variety of applications including a vehicle speed control. More specifically, the actuator includes an axially reciprocable rod, a mechanism for angularly shifting the rod about its axis between first and second angular orientations, and a quarter-turn coupling for releasably coupling the rod to an element, such as a throttle cable, to be driven thereby. Angular shifting of the rod couples and releases the rod and driven element through the quarter turn coupling. Also disclosed is a vehicle speed control responsive to vehicle acceleration and/or vehicle tilt to deactivate the speed control when either the acceleration or tilt falls outside of acceptable parameters.

11 Claims, 9 Drawing Figures

LINEAR ACTUATOR RELEASE MECHANISM AND ELECTRONIC CRUISE CONTROL BASED THEREON

BACKGROUND OF THE INVENTION

The present invention relates to linear actuator release mechanisms, both in general and as incorporated into a digitally controlled speed control.

Linear actuators, and more particularly digital linear actuators, have been utilized in a wide variety of environments to provide controlled linear reciprocation to a driven element. However, known digital linear actuators "lock-up" in case of a power loss or coil short. Such a lock-up is extremely undesirable because the driven element is maintained in a potentially dangerous position by the nonfunctional actuator. Prior artisans have attempted to alleviate lock-up problems by modifying the linear actuator motor itself. These attempted solutions have been excessively complicated, expensive, and/or ineffective.

An example of an area where this problem has been a major stumbling block is in the area of electronic cruise controls. In attempts to overcome the problems associated with a vacuum type speed control, artisans have attempted to incorporate linear actuators, such as stepper motors, into the throttle-driving mechanism. Generally, a linear actuator includes a housing and a rod extending through the housing and axially reciprocable therein. By coupling one end of the rod to the throttle cable, the throttle can be controlled by axial reciprocation of the rod. Stepper motors have not heretofore been commercially practical because the motors "lock-up" in the event of a coil short or power loss. Specifically, in the case of a "lock-up", the rod is locked in its axial orientation by the nonfunctional driving mechanism. Therefore, when electric power is lost or the motor coil shorts out, the throttle is locked in an open-throttle situation, an extremely dangerous and perhaps uncontrollable condition.

Other problems associated with known vehicle speed controls include causing the vehicle to skid or spin-out on snow, ice, gravel, or other nonresistive driving surfaces. When a vehicle hits an ice patch while operating under the control of the speed control, the wheels tend to spin against the low resistance of the ice for either or both of two reasons. First, the high driving torque applied to the drive wheels causes the wheels to spin against the low coefficient-of-friction surface. Second, when the speed control is not responsive to the drive wheels, as in a motorcycle where the speedometer is driven by the front wheel, the speed control forces the drive wheel to spin faster against the ice in an attempt to accelerate the vehicle to the desired speed. The cruise control in this case opens the vehicle throttle further and further causing the wheels to spin faster, causing instability of the vehicle on the ice. Other conditions where such an undesirable open-throttle situation can occur are where the rear wheel of a motorcycle is off the ground, for example when the motorcycle is tipped over.

SUMMARY OF THE INVENTION

The aforementioned problems are solved by the present invention wherein a linear actuator is provided including a quick-release mechanism enabling the actuator to be successfully commercially incorporated into a vehicle speed control, and indeed a variety of industrial applications where a fail-safe release mechanism is required. The linear actuator includes the essential elements included in all such actuators—namely, a housing, a rod extending through the housing, and a driving mechanism for axially reciprocating the rod within the housing. The present linear actuator further includes a coupling mechanism for releasably interconnecting the rod and an element, such as a vehicle throttle cable, to be driven thereby. The quick-release coupling includes a rotary mechanism for angularly shifting or rotating either the rod or the coupling about its axis between first and second angular orientations. The coupling further includes a locking mechanism for axially interlocking the rod and driven element when the rod is in a first angular orientation and for axially releasing the rod and driven member when the rod is in its second angular orientation.

Although the linear actuator release mechanism, which forms the subject matter of the present invention, is described in conjunction with a vehicle cruise control, the mechanism is readily adaptable to virtually any environment in which linear actuators are currently used or may be used in the future. Specifically, a vehicle speed control including the present invention is a patentable advance in addition to the mechanism per se.

A speed control incorporating the present invention is actuated by angularly shifting the rod to its first angular orientation, thereby axially interlocking the rod and driven member, for example the throttle cable. Throttle control can then be effected by reciprocating the rod within the housing to axially shift the throttle cable. The speed control is deactivated by angularly shifting the rod to its second orientation wherein the throttle cable is axially released from the rod to return under the control of the driver-controlled throttle actuator. In a preferred embodiment of the invention, the rod is biased to the second angular orientation, so that in case of power loss or other disabling condition the throttle cable will be released from the actuator rod. The present linear actuator is the first such actuator commercially suitable for use in a vehicle speed control. When the rod is shifted to its first angular position, the throttle cable is positively secured thereby. However, when the rod is shifted to its second position, namely when the speed control is deactivated or any type of electrical or mechanical malfunction occurs, the throttle cable is released by the actuator.

In another aspect of the invention, a speed control is provided including a mechanism for determining the current acceleration of the vehicle. The speed control further includes an actuator for controlling the vehicle throttle and including release means for releasing the vehicle throttle whenever apparent vehicle acceleration or deceleration is determined to be excessive. Consequently, the speed control immediately detects driving wheel slippage, for example on ice or gravel, and releases the throttle means. Optionally, the speed control is also responsive to the motorcycle tilt, clutch, and brake switches to deactivate the control upon tilting, clutching, or braking of the motorcycle.

These and other objects, advantages, and features of the invention will be more readily understood and appreciated by reference to the detailed description of the preferred embodiment and the drawings.

DETAILED DESCRIPTION OF THE PREFERRED EMBODIMENT

The linear actuator 12 (FIG. 2) of the present invention comprises digital linear actuator 48, rod rotating mechanism 50, and quarter-turn coupling or clutch 51. Actuator 48 includes drive mechanism 56 which threadably drives elongated threaded rod 54. Rod 54 is releasably coupled at one end through quarter-turn clutch 51 to a driven element and is axially slidably carried at the other end in rod rotating mechanism 50. Rod rotating mechanism 50 includes rotary solenoid 76 which, in response to one or more predetermined signals, rotates or angularly shifts rod 54 approximately 30 degrees to engage and disengage quarter-turn clutch 51. This in turn engages and disengages actuator rod 54 with whatever mechanism is coupled to the other side of quarter-turn clutch 51.

This invention has almost unlimited application. One, as noted above, is in an electronic cruise control. Hence the invention will be described in detail in conjunction with a unique electronic cruise control based thereon. Further, a motorcycle cruise control is described since motorcycles seem particularly ill suited to vacuum-type cruise controls. However, the cruise control of the present invention could be used in any vehicle.

An electronic motorcycle cruise control constructed in accordance with a preferred embodiment of the invention is illustrated in FIGS. 1-4; and the operation of the cruise control is illustrated in FIGS. 5-8. Cruise control 10 (FIG. 1) comprises throttle actuator 12, electronic control module or microprocessor 14, speed sensor 16, and switches 18. Throttle actuator 12 is coupled to throttle cable 20 and operates under the control of processor 14 to drive the cable so that the vehicle maintains a relatively constant speed. Speed control 10 is electrically coupled to vehicle electrical system or power source 22 through ignition switch 24. As is well known in the art, the motorcycle on which control 10 is mounted includes ignition switch 24, clutch switch 26, brake switch 28, and tilt switch 30, all of which are electrically coupled to microprocessor 14 through lines 32, 27, 29, and 31, respectively. Microprocessor 14 is programmed to deactivate throttle actuator 12 releasing cable 20 if any one of switches 26, 28, or 30 closes, indicating that the clutch has been put in, the brakes have been applied, or the motorcycle is tilted an excessive amount from the vertical. Speed control 10 precisely regulates the speed of the motorcycle and deactivates the speed control automatically upon the occurrence of events possibly leading to a potentially dangerous condition.

Figures 1, 3, 4:
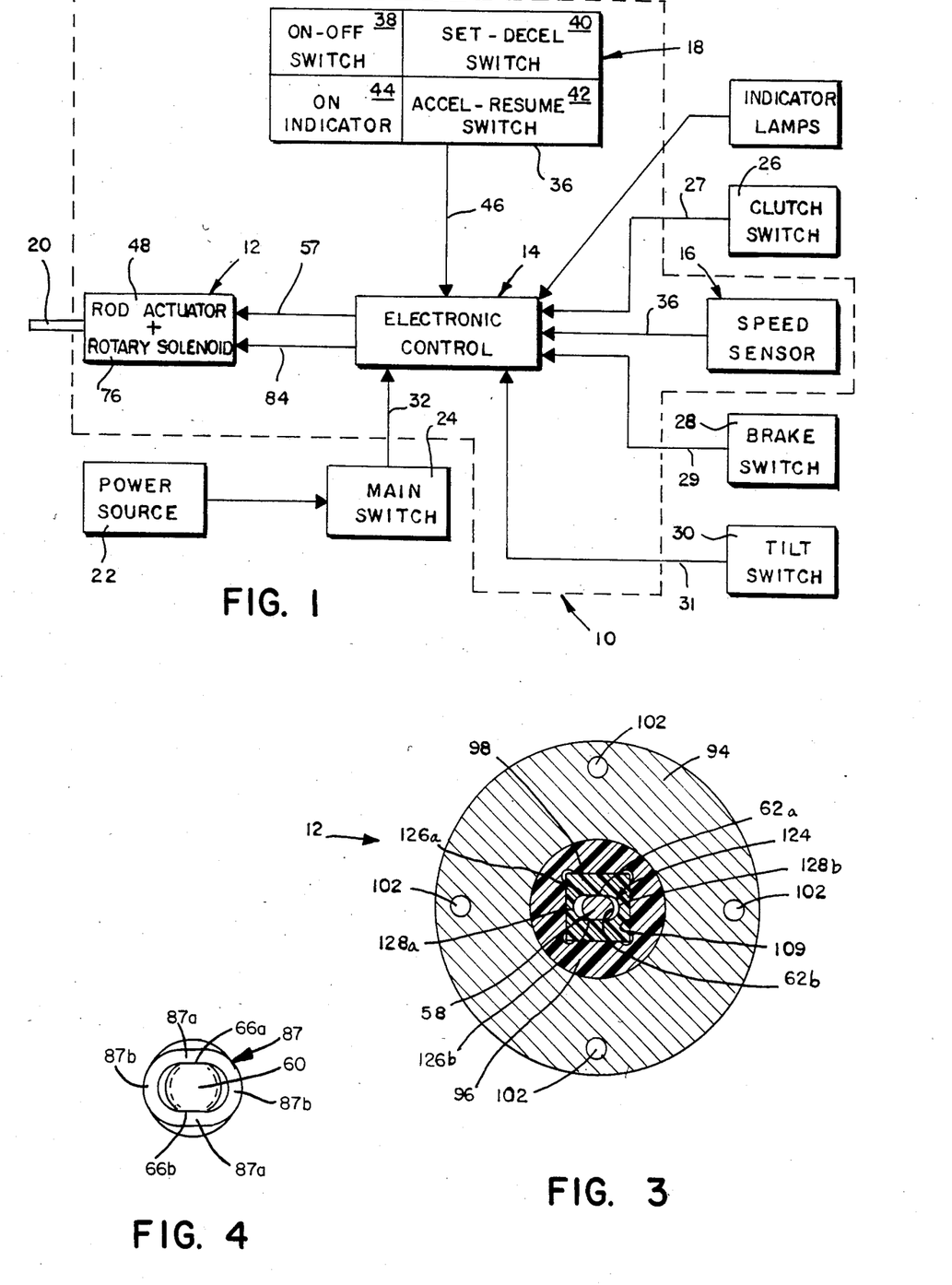
FIG. 1 is a schematic diagram of the electronic cruise control of the present invention.
FIG. 3 is a sectional view taken along plane III—III in FIG. 2.
FIG. 4 is a view taken along plane IV—IV in FIG. 2.

The various standard elements on any motorcycle on which speed control 10 is installed includes voltage source 22, ignition switch 24, clutch switch 26, brake switch 28, tilt switch 30, and indicator lamps 33 (FIG. 1). Source 22 is a standard twelve-volt electric system including a battery and an alternator or generator. Clutch switch 26 is a single-pole switch operatively connected to the clutch to be closed whenever the clutch is in and open whenever the clutch is out, whereupon the motorcycle is in gear. Brake switch 28 similarly is a single-pole switch closed when the motorcycle brakes are applied and open whenever the brakes are released. Tilt switch 30 is responsive to the inclination of the motorcycle from the vertical and is closed whenever the motorcycle is inclined excessively from the vertical and open otherwise. Preferably, tilt switch 30 remains open when the motorcycle is inclined in any operative position and is closed only when the motorcycle has tipped over. Indicator lamps 33 include engine temperature, oil temperature, oil pressure lights and the like and are electrically coupled to processor 14 through lines 35. Throttle cable 20 is operatively connected to the motorcycle throttle and has a play of approximately 1.75 inches between idle and full throttle.

Control of cruise control 10 is provided by electronic control module or microprocessor 14 (FIG. 1). This microprocessor can be any digital control device. Speed control 10, and more particularly processor 14, is coupled through ignition switch 24 and line 32 to microprocessor 14.

Speed sensor 16 (FIG. 1) can be any device for detecting an operating condition of the motorcycle indicative of vehicle speed. In the preferred embodiment, speed sensor 16 comprises a coil positioned about one of the spark plug wires and emitting a signal on line 36 to microprocessor 14 whenever a spark passes through the associated spark plug wire. Optionally, speed sensor 16 can be mounted to detect an appropriate signal on either the primary or secondary coil. Alternatively, sensor 16 can comprise a transducer installed in the motorcycle speedometer cable to directly detect the motorcycle speed. Regardless of the specific embodiment, speed sensor 16 delivers a signal to microprocessor 14 indicative of vehicle speed.

Switches 18 (FIG. 1) preferably are mounted in a common housing 36 which in turn is mounted in a convenient location on the motorcycle, preferably proximate the throttle grip. The switches included within housing 36 include ON/OFF switch 38, SET/DECELERATION switch 40, and ACCELERATION/RESUME switch 42. Also supported within housing 36 is ON indicator lamp 44. All of switches 38, 40, and 42 and indicator lamp 44 are electrically coupled to microprocessor 14 through line 46 to send appropriate signals thereto and to power the indicator lamp.

ON/OFF switch 38 is a single-pole switch, disabling cruise control 10 when in the OFF position, and enabling the control when in the ON position. Whenever switch 38 is in the ON position, indicator lamp 44 is illuminated under the control of microprocessor 14 to provide an indication to the motorcycle operator that speed control 10 is activated.

Switch 40 is a single contact, dual functon switch. When switch 40 is released, control 10 is activated to maintain the motorcycle at the speed at which it is then operating. When switch 40 is depressed, the motorcycle is permitted by processor 14 to decelerate so that the driver can select a slower speed at which to cruise. When switch 40 is then released, speed control 10 maintains the vehicle at the release speed.

ACCELERATION/RESUME switch 42 is a double-pole rocker switch and is nonfunctional until switch 40 has been depressed at least once after control 10 has been turned on. If switch 42 is deflected to the left or ACCELERATION side while control 10 is maintaining the motorcycle at a constant speed, the motorcycle will accelerate under the control of processor 14. When the desired higher speed has been reached, switch 42 is released so that control 10 maintains the motorcycle at the release speed. If switch 42 is depressed to the right or RESUME side while speed control 10 is not regulating the speed of the motorcycle, microprocessor 14 causes throttle actuator 12 to reengage throttle cable 20 and return the motorcycle to the speed at which cruise control 10 was last operating.

Figure 2:
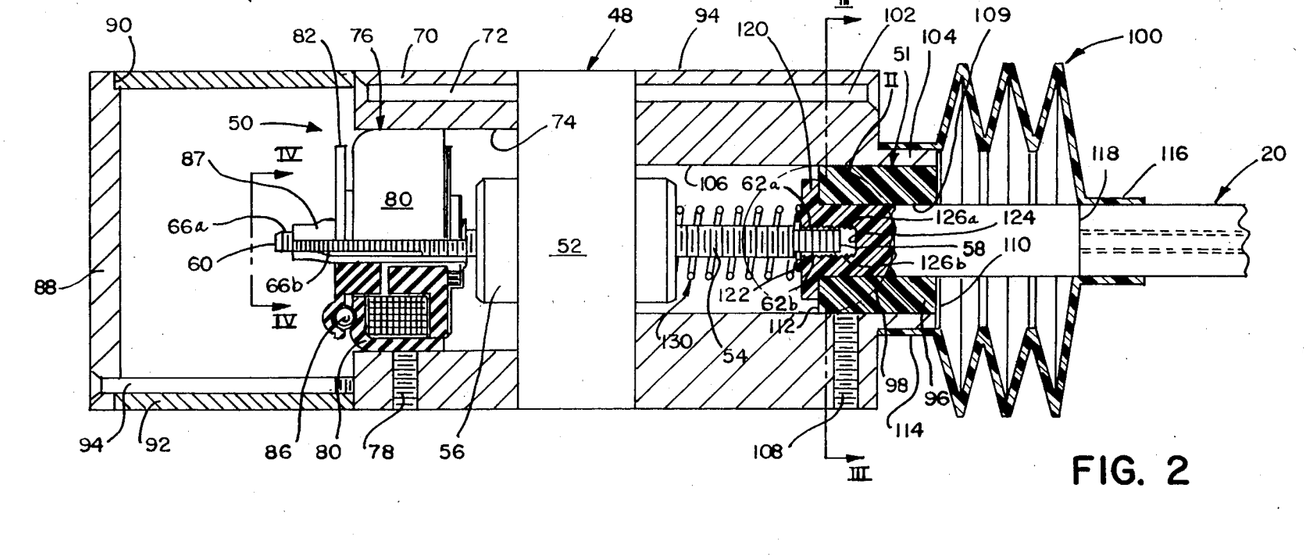
FIG. 2 is a sectional view of the throttle actuator mechanism of the speed control.

Throttle actuator 12 (FIGS. 1-4) is illustrated in greatest detail in FIG. 2. The throttle actuator 12 generally comprises digital linear actuator 48, rod rotating mechanism 50, and quarter-turn coupling or clutch 51. Linear actuator 48 can be any digital linear actuator or stepper motor commercially available. Preferably, actuator 48 provides at least 20 pounds of pulling force and may be moved axially to be accurate to 0.001 inch. In the preferred embodiment, actuator 48 is a Model Series 92000 digital linear actuator manufactured and sold under the trademark AIRPAX by the Cheshire Division of North American Phillips Controls Corp. of Cheshire, Conn. Actuator 48 includes a housing 52, actuator rod 54 extending through the housing, and drive mechanism 56 electrically coupled through line 57 to processor 14 for axially reciprocating rod 54 with respect to housing 52. Rod 54 is threaded throughout its length and includes opposite flatted ends 58 (see also FIGS. 2A) and 60. Coupling end 58 is flatted on opposite sides 62a and 62b so that the cross section of the end is as illustrated in FIG. 3. Somewhat similarly, solenoid end 60 is flatted on opposite sides 66a and 66b so that that end has a cross section as illustrated in FIG. 4. Rod 54 itself does not rotate when axially reciprocated within housing 52. Rod 54 remains angularly fixed, and driving mechanism 56 rotates with respect to the rod to axially reciprocate the rod.

Solenoid mount 70 (FIG. 2) is a generally cylindrical housing generally coaxially aligned with and secured to actuator housing 52 using screws 72. Solenoid mount 70 includes an internal wall 74 within which is supported rotary solenoid 76, which is secured in position by transverse set screw 78. Rotary solenoid is generally well known to those having ordinary skill in the art and generally includes housing 80 stationarily supported within solenoid mount 70 and dish 82 supported within the housing and shiftable between first and second angular positions or orientations approximately 30 degrees apart. Rotary solenoid 76 is operated under the control of microprocessor 14 through line 84 (see also FIG. 1). Rotatable member 82 is supported in housing 80 on balls 86 to improve rotatable movement therein. Collar 87 is fixedly secured to dish 82 and receives flatted rod end 60 (FIGS. 2 and 4). More specifically, collar 87 comprises opposite flat walls 87a interconnected by opposite semicircular walls 87b to closely receive rod end 60 (FIG. 4). Consequently, rod 54 can axially slide within collar 87, but cannot angularly shift with respect to the collar. As is well known, solenoid 76 includes springs (not shown) biasing dish 82 into a first angular orientation illustrated in FIG. 4. Upon the supply of electrical current to solenoid 76 through line 84, dish 82 rotatably shifts under the force of an electro-magnetic coupling to a second position approximately 30 degrees clockwise from the first orientation illustrated in FIG. 4. The precise amount of angular shifting is relatively unimportant and will vary with each application. Collar 87 rotatably shifts or angularly rotates rod 54 between first and second angular orientations with rotation of dish 82.

End cap 88 (FIG. 2) is a generally circular planar member defining an annular recess 90 about its periphery. Clearance sleeve 92 is a generally cylindrical housing seated within annular recess 90. Both end cap 88 and clearance sleeve 92 are secured to solenoid mount 70 using screws 94. The sleeve and end cap provide clearance for rod 54 to reciprocate within housing 52 and more particularly from a rightmost position illustrated in FIG. 2 to a leftmost position wherein rod end 60 would be closely proximate end plate 88.

Quarter-turn coupling or clutch 51 (FIGS. 2 and 3) generally comprises release housing 94, guide bearing 96 fixedly secured therein, release rod 98 slidably supported within the guide bearing, and dust-proof bellows 100 (FIG. 2 only). Release housing 94 (FIGS. 2 and 3) is a generally cylindrical member having an internal cylindrical wall 106 and is secured to actuator housing 52 using screws 102. Housing 94 includes an integral annular neck 104 extending from the housing generally opposite actuator housing 52. Guide bearing 96 is a generally cylindrical member fixedly secured within release housing 94 and secured therein utilizing set screw 108. Guide bearing 96 defines slide bore 109, generally square in cross section, and terminates in forward and rear ends 110 and 112, respectively. Bellows 100 is fabricated of a flexible memory-retaining material and includes a sleeve 114 which is tightly fitted about neck 104 to form a dust-proof seal therebetween. Throttle cable sleeve 116 is opposite sleeve 114 and tightly fits about throttle cable 20 to form a dust-proof seal therebetween. Although the adjective "quarter-turn" is used to describe coupling 51, it is not necessary that the rotation required to lock the coupling be 90 degrees—indeed in the preferred embodiment, the required rotation is 30 degrees. "Quarter-turn" generically refers to a coupling wherein two members are axially movable relative one another when in a first angular relation and axially locked when in a second different angular relation.

Figure 2A:
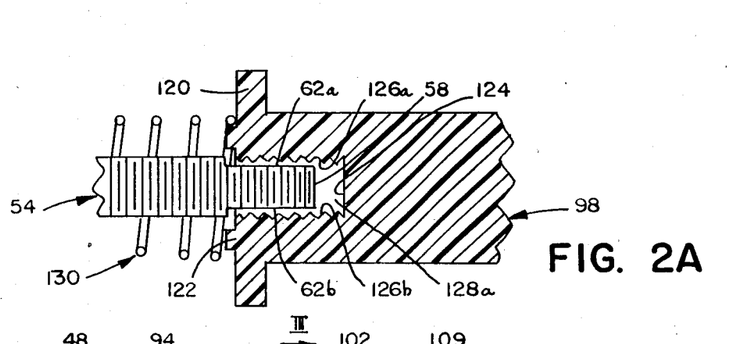
FIG. 2A is an enlarged view of the actuator rod, release rod, and spring enclosed within line II in FIG. 2.

Release rod 98 (FIGS. 2, 2A, and 3) is generally square in cross section and slidably received within bore 109 in guide bearing 96. Rod 98 includes generally planar forward end 118 operatively coupled to throttle cable 20 and a rear end including an annular flange 120. Generally coaxial with shoulder 120 is lip 122. Rod 98 defines a partially threaded aperture 124 including opposite, generally parallel threaded flatted sides 126a and 126b interconnected by semicircular sides 128a and 128b. The distance between opposite walls 126 is generally identical or somewhat larger than the distance between flatted sides 62a and 62b of rod 54 such that when sides 62 are generally parallel to walls 126, rod 54 may be inserted into aperture 124 to the position illustrated in FIGS. 2 and 2A. The distance between walls 126 is somewhat smaller than the diameter of rod 54 such that when rod 54 is angularly shifted or rotated by assembly 50 after rod 54 is inserted into release rod 98 as illustrated in FIGS. 2 and 2A, the nonflatted portions of threaded rod 54 threadedly engage opposite walls 126 to axially interlock the rod and release rod. Coil spring 130 is compressively positioned between linear actuator 48 and release rod 98, and more particularly about lip 122, to urge the release rod away from the driving mechanism. Consequently, when rod 54 and release rod 98 are axially unlocked (i.e., when rod 54 is in the orientation illustrated in FIGS. 3 and 4), release rod 98 is urged to the right as viewed in FIG. 2 until annular flange 120 abuts guide bearing 96 to release throttle cable 20.

Operation

Figure 5:
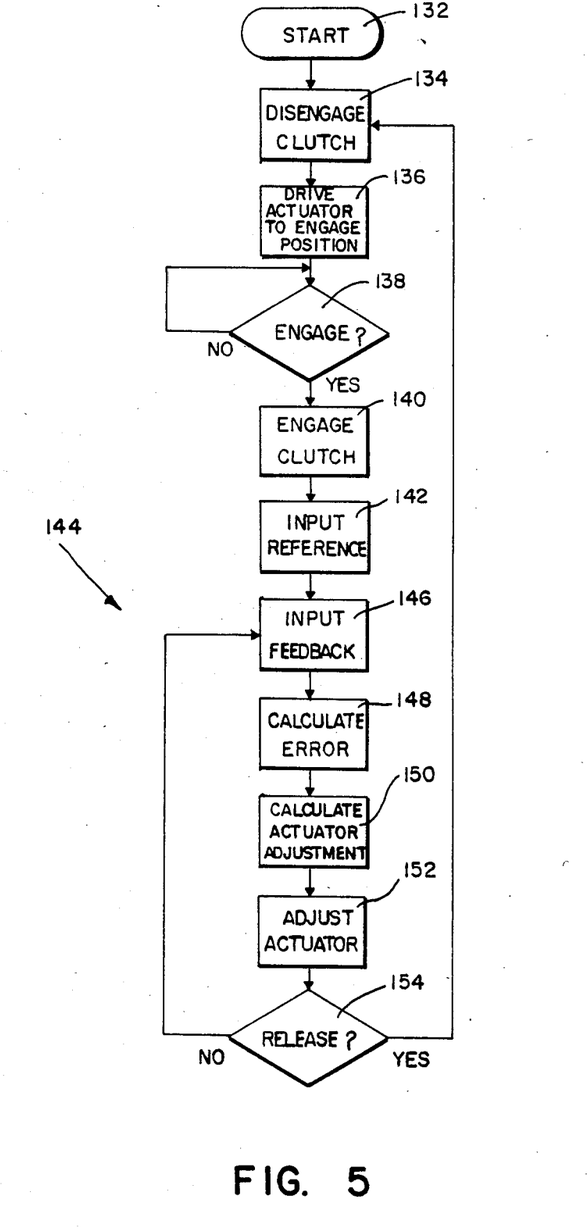
FIG. 5 is a rough flow chart of the operation of the speed control.

The general operation of cruise control 10 is illustrated in FIG. 5. When the operator desires to utilize cruise control 10, he also turns on ON/OFF switch 38 mounted on the handlebars, causing microprocessor 14 to function according to the flow chart illustrated in FIG. 5. Specifically, operation commences in block 132 and then control passes to block 134 wherein quarter-turn coupling or clutch 51 is released such that release rod 98 slides fully forward within guide bearing 96 under the bias of spring 130 to the position illustrated in FIG. 2. Clutch 51 is released by deactivating rotary solenoid 76 causing actuator rod 54 to assume its first angular orientation as illustrated in FIGS. 3 and 4. Rod 54 is then axially driven 136 fully forward to the "engage" position illustrated in FIG. 2 wherein flatted end 58 is positioned within bore 124. Decision 138 is made by microprocessor 14—if speed control 10 is to be engaged (specifically if either of SET or RESUME switches 40 or 42 has been depressed) program control passes to block 140; if not, a loop is entered at block 138 until one of SET or RESUME switches 40 and 42 is depressed.

At block 140, a signal is issued over line 84 to solenoid 76 causing the solenoid to angularly shift or rotate rod 54 to a second angular orientation approximately 30 degrees clockwise from the position illustrated in FIG. 4. As rod 54 is rotated, end 58 threadedly engages opposite walls 126 of aperture 124 to axially couple or interlock actuator rod 54 and release rod 98. Speed sensor 16 is then sampled 142 by microprocessor 14 to establish a REFERENCE SPEED within the microprocessor. Loop 144 is then entered, during which microprocessor 14 continually samples speed sensor 16 and drives rod 54 to maintain the vehicle or motorcycle at the REFERENCE SPEED. Specifically, microprocessor 14 first samples 146 speed sensor 16 to determine the current speed. The error between the current speed and the REFERENCE SPEED is then calculated 148, and an adjustment signal for actuator 12 is calculated 150 to drive the vehicle to the desired speed. This signal is then issued 152 on line 57 to cause driving mechanism 56 to axially reciprocate actuator rod 54 to adjust throttle cable 20 to drive the vehicle to the REFERENCE SPEED. Decision 154 is made regarding whether the speed control is to be released. A release condition will occur if any of the following has occurred: (1) ON/OFF switch 38 is turned off; (2) clutch switch 26, brake switch 28, or tilt switch 30 is closed indicating that the clutch is in, the brakes are applied, or the motorcycle is excessively tilted, respectively; (3) microprocessor 14 determines that the rate of acceleration/deceleration is excessive; (4) microprocessor 14 determines that the current vehicle speed is outside of an acceptable window with respect to the REFERENCE SPEED; or (5) any of the vehicle indicator lamps are illuminated. If speed control 10 as determined at block 154 is to be released, control returns to block 134. If the speed control is not to be released, control returns to block 146 to reinitiate loop 144.

Figure 6:
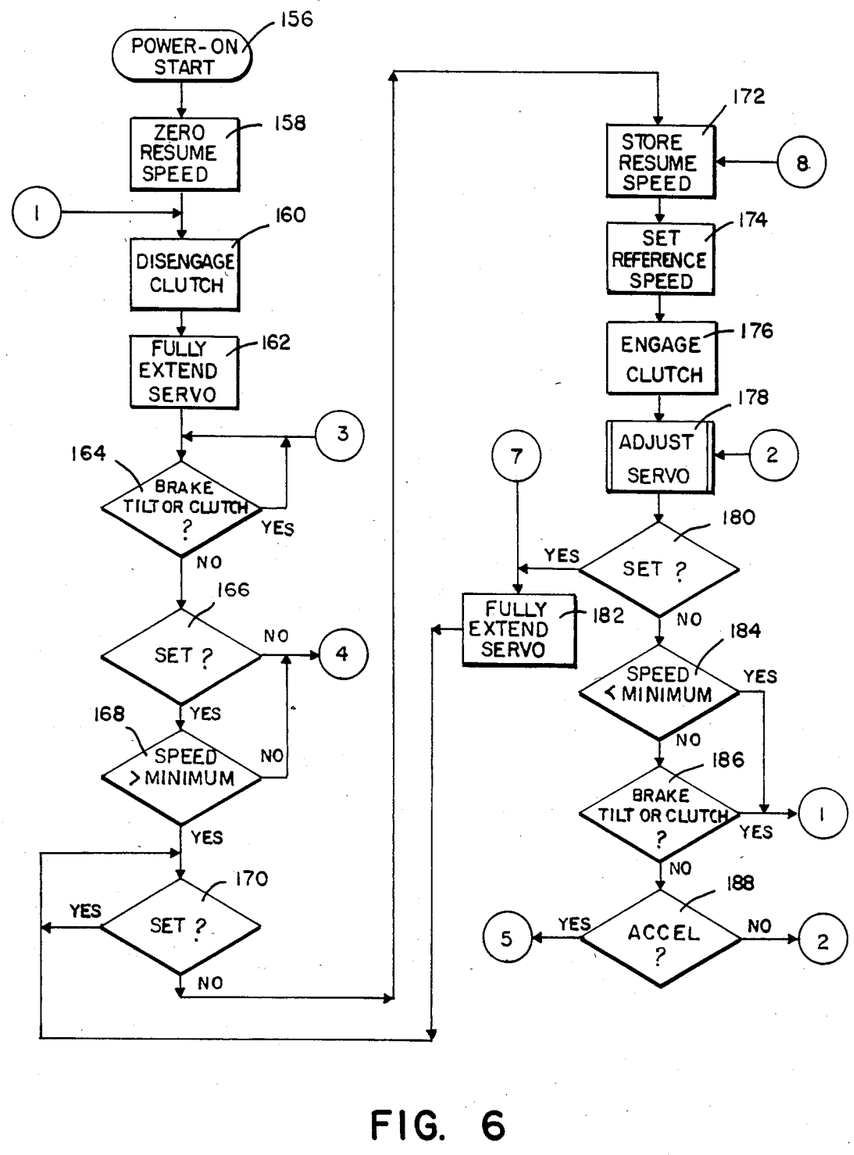
FIGS. 6-8 are detailed flow charts of the operation of the speed control.
Figure 7:
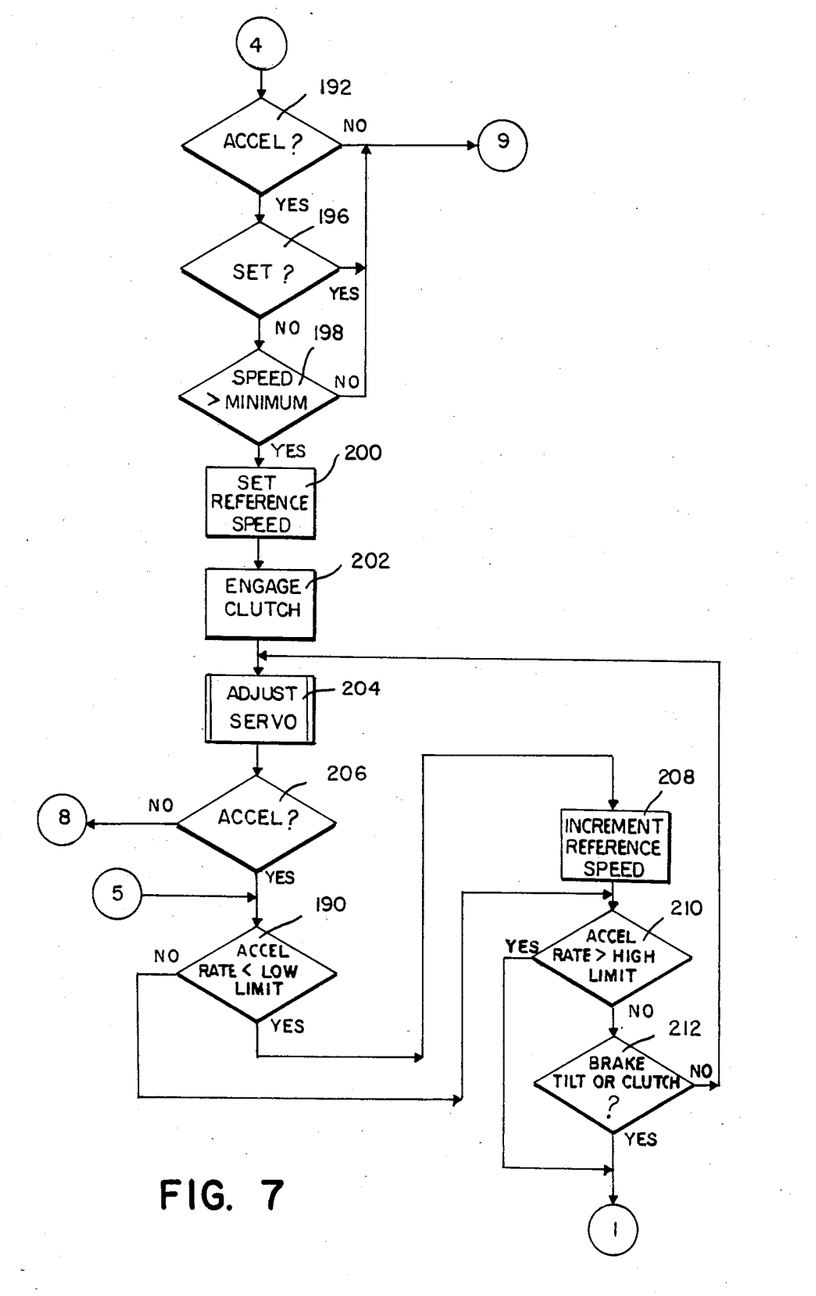
Figure 8:
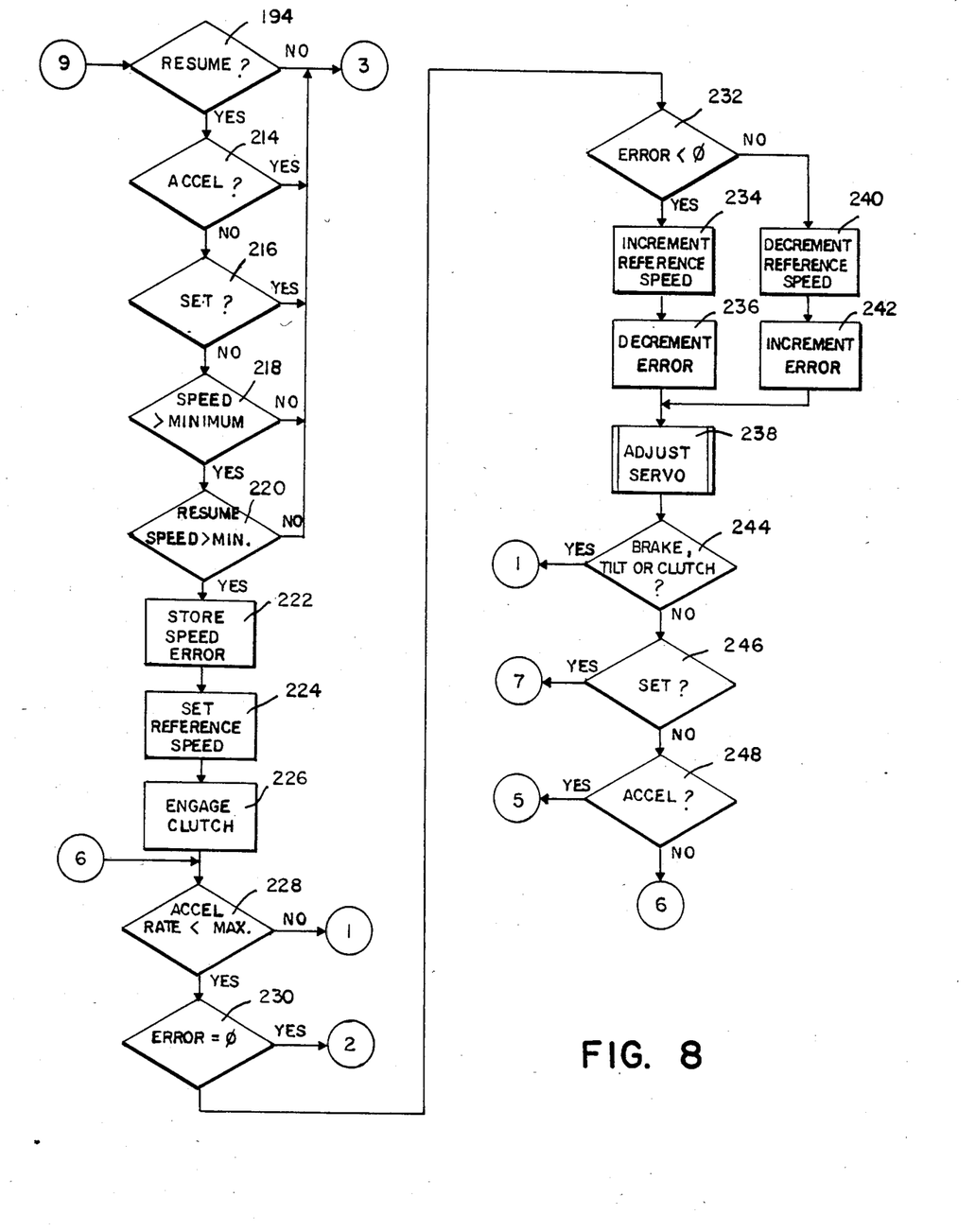

The detailed program flow is illustrated in FIGS. 6–8. When both of switches 24 and 38 are turned on, microprocessor 14 initiates the program illustrated in FIGS. 6-8 and more particularly enters block 156 (FIG. 6). The value 0 is stored 158 in RESUME SPEED. Quarter-turn coupling assembly or clutch 51 is disengaged 160 by releasing rotary solenoid 76 forcing rod 54 to its first angular orientation wherein flatted sides 62 of rod end 58 are generally parallel to flatted walls 126 of aperture 124. Signals are then issued over line 57 to drive mechanism 56 to fully extend 162 actuator rod 54 to the right as illustrated in FIG. 2 wherein rod end 58 is positioned within aperture 124. Clutch, brake, and tilt switches 26, 28, and 30 are sampled 164, and if any of these switches are closed, control remains at block 164 until all three switches are open. Decision 166 is made by microprocessor 14 to determine whether SET switch 40 has been depressed indicating that control 10 is to be set. If SET switch 40 is not depressed, control passes to block 192 (see FIG. 7). If switch 40 is depressed, control continues to block 168.

At block 168 (FIG. 6), speed sensor 16 is sampled by microprocessor 14 to determine whether the CURRENT SPEED to be maintained is greater than a given MINIMUM SPEED, for example 30 mph. If the CURRENT SPEED is not greater than this MINIMUM SPEED, control returns to block 192 (FIG. 7); if the CURRENT SPEED is greater than the minimum, control passes to block 170, wherein the microprocessor 14 again determines whether SET switch 40 is depressed. If the switch is depressed or closed, control remains at block 170 until the switch is released or open, whereupon control will pass to block 172. At block 172, speed sensor 16 is sampled and the speed is stored 172 as RESUME SPEED and also stored 174 as REFERENCE SPEED. Microprocessor 14 then issues 176 signals over line 84 to actuate rotary solenoid 76 angularly shifting rod 54 to its second angular orientation wherein threaded actuator rod 54 threadedly engages release rod 98 to axially interlock these two elements. Microprocessor 14 then issues control signals over line 57 to driving mechanism 56 to adjust linear actuator 48 as necessary to regulate throttle cable 20 to force the motorcycle to the REFERENCE SPEED.

After servo has been adjusted at block 178 (FIG. 6) as calculated to drive the vehicle to the REFERENCE SPEED, control passes to decision 180 wherein SET switch 40 is resampled to determine whether it has again been closed, indicating that the then CURRENT SPEED is to be used as the new REFERENCE SPEED. If the switch has been closed, control passes to block 182 where actuator rod 54 is driven fully to the right as illustrated in FIG. 2 and control then continues at block 170. If SET switch 40 has not been depressed, decision 184 is made to determine whether the CURRENT SPEED is below the predetermined minimum. If it is, program flow shifts to block 160 releasing the control 10. If the CURRENT SPEED is above the MINIMUM SPEED, clutch, brake, and tilt switches 26, 28, and 30 are sampled to determine whether any are closed. If at least one is closed, program control shifts to block 160. If none of the switches is closed, control passes to block 188 where a determination is made of whether ACCELERATION switch 42 has been closed or depressed. If the switch has not been closed, control returns to block 178 wherein the servo is adjusted as necessary to maintain the vehicle speed. If ACCELERATION switch 42 has been closed, program control passes to block 190 (FIG. 7).

Continuing with the description of the program control, reference is made to FIG. 7 and more particularly, block 192 whereto control passes periodically from block 166 (see FIG. 6). At block 192, microprocessor 14 determines whether ACCELERATION switch 42 is closed. If the switch is not closed, control passes to block 194 (see FIG. 8) where RESUME switch 42 is sampled. If ACCELERATION switch 42 is closed, SET switch 40 is sampled, and if it is depressed, control passes to block 194. If the SET switch is not depressed, speed sensor 16 is sampled 198, and if the CURRENT SPEED is not greater than the preselected MINIMUM SPEED, control passes to block 194 (see FIG. 8). If the CURRENT SPEED is greater than the predetermined MINIMUM SPEED, the CURRENT SPEED is stored 200 as the REFERENCE SPEED and solenoid 76 is actuated 202 to axially lock rod 54 to release rod 98. Microprocessor 14 issues control signals over line 57 to driving mechanism 56 to adjust 204 linear actuator 48 as estimated to maintain the vehicle at the REFERENCE SPEED. ACCELERATION switch 42 is again sampled 206 and if it is not closed, control returns to block 172 (see FIG. 6). If ACCELERATION switch 42 is closed, the CURRENT ACCELERATION RATE as determined by the microprocessor 14 is tested against a preselected low limit. If the CURRENT RATE is below the limit, control passes sequentially to blocks 208 and 210; if the CURRENT RATE is not below the limit, control passes directly to block 210. At block 208, the REFERENCE SPEED is incremented to effect a slight acceleration of the vehicle. The CURRENT ACCELERATION RATE is then tested 210 against a predetermined high limit. If below the high limit, clutch, brake, and tilt switches 26, 28, and 30, respectively, are tested 212; and if none are closed, control returns to block 204 wherein the servo is readjusted as estimated to maintain the vehicle speed. If one of switches 26, 28, and 30 is closed, control returns to block 160 (see FIG. 6). At block 210, if the acceleration rate is greater than the predetermined high limit, control passes directly to block 160 (FIG. 6) wherein the quarter-turn coupling assembly 51 is released to prevent excessive acceleration in case of ice, gravel, or tip-over.

In FIG. 8, control branches to block 194 from any of blocks 192, 196, and 198 (see FIG. 7). RESUME switch 42 is sampled at block 194, and if the switch is not closed, control passes to block 164 (see FIG. 6). If RESUME switch 42 is closed, ACCELERATION switch 42 is sampled 214 to determine its stage. If closed, control passes to block 164 (see FIG. 6); if open, control passes to block 216 wherein SET switch 40 is sampled. If SET switch 40 has also been closed, control passes to block 164 (see FIG. 6); if SET switch 40 is open, speed sensor 16 is sampled 218 and tested against the predetermined MINIMUM SPEED. If the CURRENT SPEED is less than or equal to the MINIMUM SPEED, control passes to block 164 (see FIG. 6); if greater than the MINIMUM SPEED, the RESUME SPEED is tested 220 against the predetermined MINIMUM SPEED and if less than or equal to, control passes to block 164 (see FIG. 6).

If the RESUME SPEED is greater than the MINIMUM SPEED, the current SPEED ERROR is calculated and stored 222 as the difference between the CURRENT SPEED and the RESUME SPEED. The REFERENCE SPEED is set 224 to be the CURRENT SPEED. Solenoid 76 is activated 226 to engage quarter-turn coupling 51 and the CURRENT ACCELERATION RATE is tested against the predetermined maximum acceleration rate. If the CURRENT RATE is greater than or equal to the maximum rate, control passes to block 160 (see FIG. 6), whereupon the speed control 10 is released. Otherwise, the SPEED ERROR is tested against the value 0, and if equal to zero, control passes to block 178 (see FIG. 6). If the SPEED ERROR is not equal to zero, a test 232 is conducted to determine whether it is less than zero. If the SPEED ERROR is less than zero, the REFERENCE SPEED is incremented 234 and the SPEED ERROR is decremented 236 and control passes to block 238. If the SPEED ERROR is determined to be greater than zero at block 232, the REFERENCE SPEED is decremented 240 and the SPEED ERROR is incremented 242 before control returns to block 238. At block 238, the servo or linear actuator 48 is readjusted.

From block 238, clutch, brake, and tilt switches 26, 28, and 30, respectively, are tested 244, and if any are closed, control returns to block 160 (see FIG. 6) wherein speed control 10 is disengaged. If all of the switches are open, SET switch 40 is sampled 246 to determine whether it is closed. If SET switch 40 is closed, control passes to block 182 (see FIG. 6); and if SET switch 40 is not closed, ACCELERATION switch 42 is tested 248 to determine whether it has been closed. If the switch is closed, control passes to block 190 (see FIG. 7); and if open, control returns to block 228.

The above description is that of a preferred embodiment of the invention. Various changes and alterations might be made without departing from the spirit and broader aspects of the invention as set forth in the appended claims, which are to be interpreted in accordance with the principles of patent law, including the doctrine of equivalents.

The embodiments of the invention in which an exclusive property or privilege is claimed are defined as follows:

1. A linear actuator comprising:
   an elongated rod;
   electrically controlled drive means for axially reciprocating said rod without substantially rotating said rod;
   coupling means for releasably coupling said rod with an element to be reciprocated thereby, said coupling means including an attachment member adapted to be secured to the element, said coupling means further including axial locking means for axially locking said rod and said attachment member when said rod and said attachment member are in a locked angular relation and for axially unlocking said rod and said attachment member when said rod and said attachment member are in an unlocked angular relation;
   electrically controlled angular shifting means for angularly shifting at least one of said rod and said attachment member to position said rod and said attachment member in said locked and unlocked angular relations; and
   bias means for biasing at least one of said rod and said attachment member toward said unlocked angular relation, whereby the coupling means is unlocked in case of electrical power malfunction.

2. A linear actuator as defined in claim 1 wherein said angular shifting means comprises:
a collar through which said rod extends, said rod being axially reciprocable within said collar, said rod being generally nonrotatable within said collar; and
means for angularly shifting said collar to angularly shift said rod.

3. A linear actuator as defined in claim 2 wherein said angular shifting means and said bias means comprise a rotary solenoid having a home position causing said rod and said attachment portion to assume said unlocked angular relation.

4. A linear actuator as defined in claim 3 wherein said axial locking means comprises a quarter-turn coupling.

5. A linear actuator as defined in claim 4 wherein said rod and said drive means together comprise a digital linear actuator.

6. A linear actuator as defined in claim 1 wherein said axial locking means comprises a quarter-turn coupling.

7. A linear actuator as defined in claim 1 wherein said angular shifting means and said bias means comprise a rotary solenoid having a home position causing said rod and said attachment portion to assume said unlocked angular relation.

8. A linear actuator as defined in claim 4 wherein said axial locking means comprises:
said rod including an end having a pair of opposite flattened sides and a pair of opposite threaded sides; and
said attachment member defining a socket having a pair of opposite flattened sides and a pair of opposite threaded sides, whereby said rod end can be axially shifted into and out of said socket when said rod and said attachment member are in said unlocked angular relation with said flattened sides aligned, and whereby said threaded sides of said rod and said socket axially interlock said rod and attachment member when said rod and said attachment member are in said locked angular relation.

9. A linear actuator as defined in claim 6 wherein said axial locking means comprises:
said rod including an end having a pair of opposite flattened sides and a pair of opposite threaded sides; and
said attachment member defining a socket having a pair of opposite flattened sides and a pair of opposite threaded sides, whereby said rod end can be axially shifted into and out of said socket when said rod and said attachment member are in said unlocked angular relation with said flattened sides aligned, and whereby said threaded sides of said rod and said socket axially interlock said rod and attachment member when said rod and said attachment member are in said locked angular relation.

10. A linear actuator as defined in claim 1 further comprising spring means for biasing said attachment member away from said drive means, whereby said attachment member is urged away from said drive means when said rod and said attachment member are in said unlocked angular relation.

11. A linear actuator as defined in claim 1 wherein said rod is threaded and wherein said drive means threadedly engages said rod for threadedly driving said rod.

* * * * *